Figure 1:
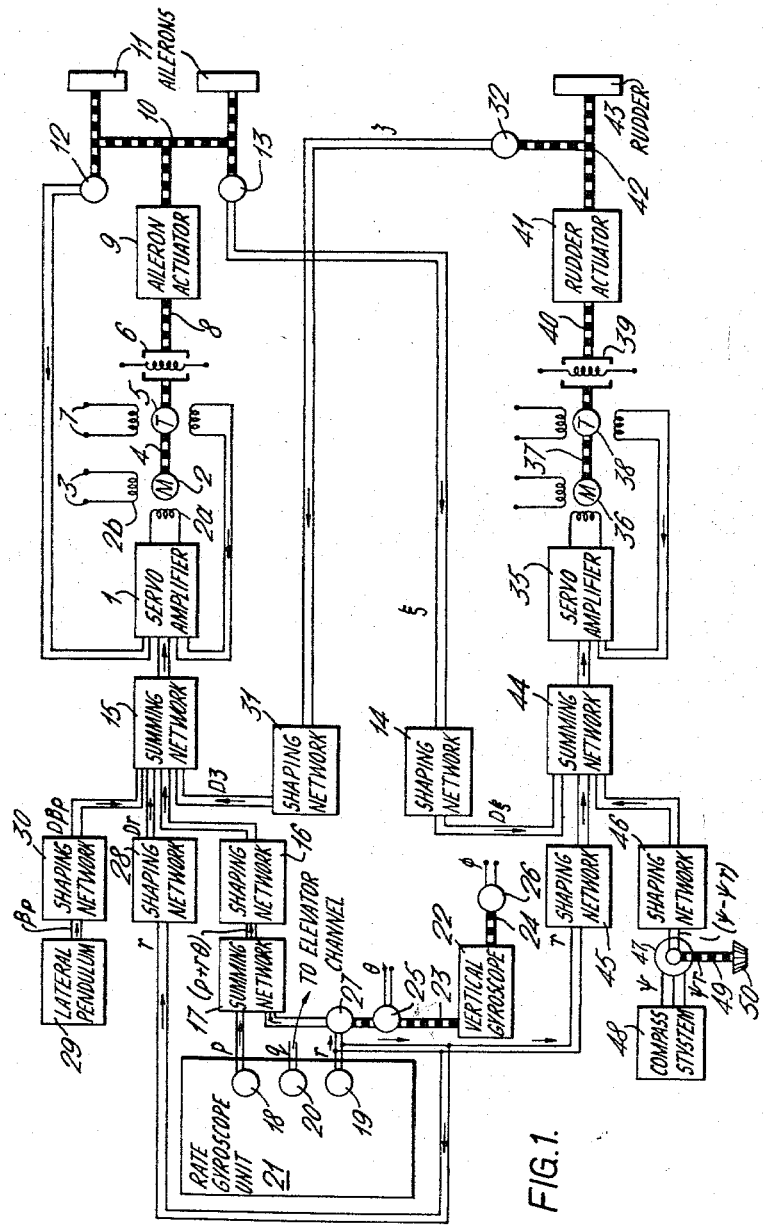

United States Patent Office 3,178,134
Patented Apr. 13, 1965

3,178,134
AUTOMATIC FLIGHT CONTROL SYSTEMS FOR AIRCRAFT
Kenneth Fearnside, Bredon, near Tewkesbury, and Heinz Pollak, Bishops Cleeve, Cheltenham, England, assignors to S. Smith & Sons (England) Limited, London, England, a British company
Filed July 19, 1962, Ser. No. 210,987
16 Claims. (Cl. 244—77)

The present invention relates to automatic flight control systems for aircraft and is concerned in particular with systems which are capable of controlling an aircraft automatically during the whole of a landing manoeuvre.

It has been proposed to provide an automatic control system for this purpose which operates in such a manner that the landing manoeuvre is divided into various phases, as follows, the heights specified being by way of example only and being, of course, variable within limits according to requirements.

(i) Manoeuvring to fly on to a glidepath as defined by the localiser and glidepath beams of a conventional I.L.S. system; the track phase.

(ii) Flying down the glidepath, maintaining constant air speed and pitch attitude; the glide phase.

(iii) From a height of say 150 ft., the glidepath signals of the I.L.S. system being no longer usable, continuing to fly down an extension of the glidepath, maintaining the same airspeed and the mean pitch attitude subsisting during the last part of the glide phase; the attitude phase.

(iv) From a height of say 50 ft. commencing the flare that is to say starrting to following a path which, in the vertical plane, is curved so as to level out smoothly to the surface of the runway and at the same time closing the throttles; the flare phase.

(v) From a height of say 30 ft., continuing the flare, and, if there is any drift due to a cross wind component, controlling the rudder and ailerons at some preselected altitude so as to rotate the aircraft in yaw, maintaining the wings level, to align its fore and aft axis with the runway; the land phase.

In phases (iii) to (v), azimuth guidance may still be obtained, up until the moment of kicking-off drift, from the localiser beam of the I.L.S. system, if suitable, or from a leader cable guidance system such as that described in British Patent Specification No. 820,319.

Of these phases, phases (i) and (ii) are conventional landing approach practice during which an automatic pilot included in the control system is set by means of switches or other controls to operate in known manner under the control of signals supplied to it, inter alia, from glidepath and localiser receivers provided in the aircraft to manoeuvre the aircraft until it is positioned on the glidepath and then to maintain it on the glidepath whilst flying down it (conventional automatic flight control systems for aircraft often include facilities for coupling an automatic pilot to suitable signal sources in the manner required to bring this about, the intention being with a conventional system, that the automatic control can be used to control the aircraft down to an altitude of say 200 ft. after which a human pilot must take over control). In addition, the airspeed may be maintained at the required value either manually or preferably by an automatic throttle control system forming a part of the flight control system as a whole.

In phase (iii), it has been proposed that the control system should operate to maintain the mean pitch attitude subsisting during the last part of phase (ii), azimuth guidance being obtained from signals derived either from a localiser receiver or from a leader cable signal receiver. The signals from a localiser receiver may be employed provided that the transmitter is situated along the centre line of the runway concerned and in addition that the localiser system as a whole is of sufficient inherent accuracy. The aircraft is also maintained level in bank apart from any correcting manoeuvres required to maintain the aircraft on the correct heading on the glidepath. The airspeed is maintained at the same value as in phase (ii).

In phase (iv), it has been proposed that the elevator channel of the automatic pilot should commence to operate in response to signals from a frequency modulated radio altimeter to control the elevators in such a manner that the aircraft (considering only vertical manoeuvres) is manoeuvred to fly as closely as possible to a datum flare path defined by an equation such as:

$$h + \tau D h = 0 \qquad (i)$$

where $\tau$ is a time constant of magnitude, say 4–8 seconds, $D$ is the differential operator $d/dt$ ($t$ representing time) and $h$ is the aircraft's altitude relative to a datum which may be ground level or a level a few feet above or below ground level. At the commencement of phase (iv), the throttles are closed either manually or automatically if automatic throttle control is provided.

Further according to these proposals, in phase (v), the elevator control continues as in phase (iv) but any drift angle is removed, shortly before touching down, by an operation equivalent to that known by human pilots as "kicking-off drift," the rudder being operated under automatic control to rotate the aircraft about its yaw axis until its fore and aft axis is aligned with the runway and the ailerons being operated simultaneously to prevent any roll.

During the land phase, the wings of the aircraft must be held substantially level to obviate any possibility of a wing tip touching the ground. However, if there is any cross wind component, it will be necessary, as envisaged above to carry out automatically an operation equivalent to "kicking-off drift." Since, when this operation requires to be carried out, the aircraft can not be steered by banking, it has been proposed to operate the rudder, at a suitable moment as determined by radio altimeter signals and under the control of switches operated under the control thereof, in dependence upon a signal representing the difference between the aircraft's heading and the direction of the runway and in particular to apply the rudder at a rate proportional to this heading error signal in a sense such as to yaw the aircraft on to the desired heading.

When this is done, a rolling moment will be applied to the aircraft, owing to the inherent coupling of its yawing and rolling motions, tending to dip the wing on the inside of the turning movement. The ailerons must therefore be operated simultaneously to oppose this moment and to maintain the wings substantially level. Rolling moments tending to disturb the aircraft's bank attitude will occur also at other times during the flare and land phases, for example on operation of the rudder to prevent yawing and also if there is any change in the lateral wind or in the rate of yaw of the aircraft. When drift is kicked-off there will be an effective change in the lateral wind and it may also change at any time due to natural causes e.g. due to gusting. It is therefore necessary to feed the aileron channel of the autopilot with signals which will enable it to counter any of these rolling moments at the earliest possible moment and thus to minimise or even eliminate their effects.

The present invention is concerned particularly with the control of an aircraft automatically during the operation of kicking-off drift and also during the flare phase of a landing. It will be appreciated that whilst the invention is applicable and indeed has been developed in connection with automatic flight control systems of the kind capable of controlling an aircraft whilst carrying out a landing in the manner described above, it is in fact applicable to any other systems for the same purpose, provided that flare and land phases (or their equivalents) similar to those set out above are included.

According to the present invention an automatic flight control system capable of controlling an aircraft automatically during the flare and land phases of a landing includes a lateral accelerometer and means for including in the demand signal generated for the control of the aircraft's ailerons or equivalent control surfaces during one or both of the said phases and at least from the moment of initiating the operation of kicking-off drift, a component signal which is derived from the accelerometer and represents a function of the aircraft's lateral acceleration the signal being applied in a sense such as to oppose any tendency of the aircraft to bank.

By "demand signal" is here meant a signal which is applied to a servo system for controlling the operation of the ailerons or other control surfaces and represents, in a manner which will depend in part on the particular characteristics of the servo system and in part on the purpose for which the demand signal is applied, a demand to the servo system for movement or positioning of the aileron or other control surfaces. Thus, for example, if the servo system is a conventional position servo, the demand signal may represent a demanded aileron position, and will usually include a basic control term representing or dependent on the aircraft's actual bank attitude, as measured for example by a vertical gyroscope. In a simple rate servo, the demand signal may similarly represent a demanded rate of aileron movement and will usually include a basic control term representing or dependent on the aircraft's rate of bank, as measured for example by one or more rate gyroscopes. Said component signal would in all cases be applied in a sense to counteract any rolling movement arising, for example from application of the rudder, thus maintaining the aircraft substantially level in bank.

The demand signal may include further components such as:

(1) A component representing any departure of the aircraft's bank attitude from level.

(2) A component representing the aircraft's rate of bank.

(3) One or more components representing any change in the aircraft's heading or its rate of change of heading (rate of yaw).

(4) One or more components representing the rudder position or the rate of change of rudder position.

The demand signal may further include derivatives of any or all of the further components and the one component may represent a function of the lateral acceleration which is or includes one or more derivatives thereof.

The lateral accelerometer may be a lateral pendulum, that is to say a pendulum mounted in the aircraft for free rotation about an axis parallel to the fore and aft axis of the aircraft, the pendulum preferably being mounted at a point forward of the aircraft's centre-of-gravity, and a signal representing any angular deflection of the moving parts of the pendulum from their datum position (i.e. vertical when the aircraft is still and level) may then be employed as a signal representing the aircraft's lateral acceleration. The accelerometer is required to measure side-slip but, in fact, will detect any side-force acting on the aircraft. If it is suitably positioned forward of the centre of gravity of the aircraft, most of the force measured will be due to side-slip, at least during the manoeuvre under consideration, but there may still be a component due to operation of the rudder. Any such component may be compensated by a further component, the fourth listed above, arising from movement of the rudder. If the accelerometer is near the centre of gravity, the effect of the rudder will be greater.

At the same time, a system according to the present invention may include means for controlling the aircraft's rudder or equivalent control surfaces in accordance with a demand signal having a first component which is a function of any difference between the aircraft's heading and a set direction which is set in operation to be that of the runway in the direction of landing, and, if required, further components which may include:

(i) a component representing a function of aileron position, and (ii) one or more components representing functions of the aircraft's rate of yaw and the rate of change thereof.

The relevant parts of an example of an automatic flight control system according to the present invention will now be described by way of example with reference to the accompanying drawing in which:

FIGURE 1 shows a block circuit diagram of the parts of the system.

The flight control system of which a block diagram of parts of the rudder and aileron channels is shown in FIGURE 1, is one which is built around an automatic pilot employing the rate/rate system of control, i.e. one in which the control surfaces are moved by servo systems at a rate determined by demanded rate of movement signals applied to the inputs of the servo systems. As shown in FIGURE 1, the inter-connections are those which apply from the moment of initiating the automatic kicking-off drift operation and it will be understood that switches (not shown) are provided to change the inter-connections where necessary and to introduce further connections to additional signal sources for other modes of operation of the system.

FIGURE 1 shows a servo amplifier 1 provided for the aileron control channel, the output of the amplifier 1 controlling the energisation of the control phase winding 2a of a two phase induction servo motor 2. The servo motor 2 has a reference phase winding 2b which is connected to terminals across which a reference voltage source 3 (not shown) is connected in operation. The motor 2 drives a shaft 4 by which is driven a tachometer generator 5 for generating a feedback signal representing the rate of rotation of the shaft 4 and the input member of an electromagnetic clutch 6. The input winding of the tachometer generator 5 is connected across terminals 7 to which, like terminals 3, a suitable reference voltage source is coupled in operation. The output winding of the generator 5 is coupled to an input of the amplifier 1, providing a rate feedback voltage in known manner. The coil of the clutch 6 is connected in a conventional D.C. energising circuit (not shown) which includes switches for determining whether or not the circuit is completed and thus whether the output drive from the aileron channel of the automatic pilot is engaged or not.

The output member of the clutch 6 is mounted on a further shaft 8 which is coupled to whatever form of aileron actuator 9 is provided in the aircraft concerned. The output of the actuator 9 is shown coupled directly by shafts 10 to a pair of aileron surfaces 11. It will be appreciated that the arrangement of shaft 8, actuator 9 and shafts 10 shown coupling the output member of the clutch 6 to the ailerons 11 is in fact simplified and that it may take many forms depending on the form of actuator and control run provided in a particular aircraft. For example, the shaft 8 may drive part of the control run directly, the latter then providing an input drive to some form of hydraulic actuator of which there may be a separate one for each aileron or aileron section. Also provided are two aileron position pick-offs 12 and 13, for example potentiometers or synchros, driven by the shaft 10, one providing a position feedback signal which is fed to a further input of the servo amplifier 1, the other providing an aileron position signal which is fed through a shaping network 14 to the rudder channel. The characteristics of network 14 and the purpose of this cross feed will be described further in connection with the rudder channel.

Apart from the two feedback signal inputs already described the amplifier 1 has a third input which is coupled to the output of a signal summing network 15 having four separate inputs, the output of the network 15 in operation being a signal representing a demanded rate of aileron movement. For the particular aircraft for which the system was designed a demanded rate of aileron movement signal $(D\xi)_D$ given by the following equation was found suitable.

$$(D\xi)_D = F_1 \frac{1+n_1\tau_1 D}{1+\tau_1 D}(D\phi) - F_2 D\beta_p - F_3 D\zeta + F_4 D_r \quad (1)$$

where $n_1$, $F_1$, $F_2$, $F_3$ and $F_4$ are constants, $\tau_1$ is a constant having the dimensions of time, D is the differential operator $d/dt$, $\xi$ is aileron position, $(D\phi)$ is the aircraft's actual rate of bank relative to a set of gravity axes, $\beta_p$ is the deviation angle of a lateral pendulum, $\zeta$ is the aircraft's rudder position and $r$ is the aircraft's rate of turn about its yaw axis.

The first term on the right hand side of Equation 1 is employed in all modes of operation of the system, being a signal representing the aircraft's rate of bank with some phase advance as determined by the values of $n_1$, and $\tau_1$, in known manner, and from which according to the different modes of operation is subtracted a signal representing a demanded rate of bank $(D\phi)_D$ with or without other terms for balancing and datum adjusting purposes. A signal representing this term is supplied to one input of the summing network 15 from the output of a shaping network 16 having phase advance characteristics such that its output represents the input when operated by the operational function $(1+n_1\tau_1 D)/(1+\tau_1 D)$. This network 16 may be of any known and suitable form.

The input to network 16 is a signal representing $(D\phi)$ which is generated to a degree of approximation by summing, in network 17, signals representing the quantities $p$ (the aircraft's rate of turn about its roll axis) and $r\theta$, where $r$ is the aircraft's rate of turn about its yaw axis and $\theta$ is its pitch attitude. The expression $(p+r\theta)$ is taken as an approximation to the expression $$(p \cos \theta + r \sin \theta)$$

which properly represents the quantity $(D\phi)$ in terms of $p$ and $r$ for a given pitch angle $\theta$. Signals representing $p$ and $r$ are generated by pick-offs associated with suitably oriented rate gyroscopes 18 and 19 forming part of the basic automatic pilot and mounted on a platform fixed in the aircraft. The gyroscopes 18 and 19, together with a third gyroscope 20 for providing a signal representing the aircraft's rate of turn $q$ about its pitch axis, are included in a rate gyroscope unit 21. The output of gyroscope 20 is utilised, in known manner and as indicated in FIGURE 1, in the elevator channel of the automatic pilot.

The basic automatic pilot further includes a vertical gyroscope 22 having output shafts 23 and 24 which are positioned in accordance with the aircraft's pitch and bank angles $\theta$ and $\phi$. Both shafts drive pick-offs 25 or 26 e.g. synchros and/or potentiometers of which more than one may be provided on both shafts although only one is shown in each case. The signals from these pick-offs 25 and 26 are utilised respectively in the elevator channel of the automatic pilot and in the aileron channel in modes other than that presently considered. The shaft 23 further drives the shaft of a potentiometer 27 across the whole resistance of which is applied a signal representing $r$ from gyroscope 19. The voltage across the slide and one end of the resistance will then represent $r\theta$ and this voltage is applied to one input of summing network 17, the other input of which is supplied with a signal representing $p$ from gyroscope 18. The output from network 17 thus represents as required the quantity $(p+r\theta)$ or $(D\phi)$.

A second input of network 15 is coupled to the output of shaping network 28 which in this case is a differentiating network and is supplied with a signal representing $r$ from rate gyroscope 19. The output of network 28 then represents the quantity $Dr$, as required to provide the fourth term on the right hand side of Equation 1. This term is included in the sense to counteract any rolling movement arising from yawing motion.

A third input to network 15 is derived from a lateral pendulum unit 29, that is to say, a unit including a pendulum mounted for free angular displacement about an axis parallel to the fore-aft axis of the aircraft, the pendulum being mounted preferably forward of the centre of gravity of the aircraft. The third input to the network 15 is derived from the unit 29 through a shaping network 30 which again in this case is a differentiating network giving an output $D\beta_p$ where $\beta_p$ is the angular deflection of the pendulum from its datum position (i.e. vertical when the aircraft is still and level) as this is represented by an output signal obtained from a pick-off associated with the pendulum. This provides a signal representing the second term on the right hand side of Equation 1.

The remaining input to network 15 comes from a network 31 which, as described below in connection with the rudder channel, receives at its input a signal representing the rudder position $\zeta$. Network 31 is again a differentiating network and provides an output representing $D\zeta$ as required to provide the third term on the right hand side of Equation 1. This component, again is included in the sense required to counteract any rolling moment arising from operation of the rudder and also to compensate, if necessary, for any effect which operation of the rudder may have on the lateral pendulum.

The summing network 15 operates to combine the signals from networks 16, 28, 30 and 31 in the proportions and in the senses required by the constants and signs in Equation 1, the constants $F_1-F_4$ being determined, it will be appreciated, in accordance with the aircraft's characteristics.

The rudder channel is similar to the aileron channel having a servo amplifier 35 controlling a servo motor 36, the shaft 37 of which drives a tachometer generator 38 and the input member of an electromagnetic clutch 39. The output of the tachometer generator is fed back to an input of the amplifier 35 to provide rate feedback, whilst the output member of the clutch 39 drives a shaft 40 and through it a rudder actuator 41, shaft 42 and the rudder 43, this latter combination being, as with the ailerons a simplified schematic one shown for the purposes of description only. The shaft 42 drives a rudder position pick-off 32 the output of which is fed to the input of network 31 in the aileron channel in accordance with the requirements previously described above.

The remaining input of the servo amplifier 35 is supplied in operation with a signal representing a demanded rate of rudder movement $(D\zeta)_D$ given by the equation:

$$(D\zeta)_D = H_1 \frac{Dr}{1+\tau_2 D} + H_2 r + H_3 \frac{1+n_3\tau_3 D}{1+\tau_3 D}(\psi-\psi_r) + aD\xi \quad (2)$$

where $H_1$, $H_2$, $H_3$, $a$, and $n_3$ are constants, $\xi$, D and $r$ are as previously defined, $\tau_2$ and $\tau_3$ are constants with the dimensions of time, $\psi$ is the aircraft's heading and $\psi_r$ is a set heading representing the direction of the runway centre line in the direction chosen for landing. The signal representing $(D\zeta)_D$ is generated in a summing network 44, the output of which is fed to the demand signal input of amplifier 35. Network 44 has three inputs, the connections to which are described below.

A signal representing the first two terms on the right hand side of Equation 2 is supplied to one input of summing network 44 from a shaping network 45 which is fed with a signal representing $r$ from the rate gyroscope 19. Network 45 has two parallel channels one a simple proportional channel and the other having a transfer $D/(1+\tau_2 D)$. The outputs of the two parallel channels in network 45 are combined in suitable proportions, the combined signal being passed to network 44.

A second input of network 44 is coupled to the output of network 14 described above, the output of which is a signal representing $D\xi$ and which can therefore be used to provide a component representing the fourth term on the right hand side of Equation 2.

The third input to network 44 is coupled to the output of a shaping network 46 which is a phase advance network of known form having a transfer function $$(1+n_3\tau_3 D)/(1+\tau_3 D)$$

The input of network 46 is coupled to the output from the motor of a synchro transformer 47, the stator of which is energised in accordance with aircraft's heading $\psi$ by signals from a conventional gyro-magnetic compass system 48. A shaft 49 is adjusted manually by means of a knob 50 to position the rotor of the synchro 47 in accordance with the direction of the runway on which it is desired to land, this adjustment being made previously to the commencement of that phase of the landing which is being considered here and probably before the landing manoeuvre is commenced. The signal from the motor of synchro 47 thus represents $(\psi-\psi_r)$ and the output from network 46 thus takes the form required to provide a signal representing the third term on the right hand side of Equation 2. Network 44 combines the various signals supplied to it in appropriate proportions and senses so as to provide at its output a signal representing $(D\xi)_D$ as given by Equation 2.

Whilst a particular system has been described in which the control laws represented by Equations 1 and 2 are employed, it will be appreciated that these may be varied as required for different aircraft. Other terms which may appear in Equation 1, requiring the generation of appropriate components of the demand signal in addition to or instead of some or all of those described, are terms dependent on:

(1) Any departure of the aircraft's bank attitude from level
(2) The aircraft's rudder angle $\zeta$ (as opposed to $D\zeta$ in Equation 1)
(3) The change of heading $\int D\psi dt$
(4) The lateral pendulum position $\beta_p$ (as opposed to $D\beta_p$), and
(5) The aircraft's rate of yaw.

Similarly Equation 2 may include a term in $\xi$ and terms representing functions of $r$ and $(\psi-\psi_r)$ other than those described. Again, in both channels, the characteristics of the shaping and summing networks can be varied as required to alter the precise functions of the quantities employed and the proportions in which they are combined.

The lateral accelerometer employed in the system described is a lateral pendulum but other types of accelerometer may be employed.

Throughout the description, no mention has been made of the nature of the signals employed and it will be appreciated that those may be A.C. or D.C. signals as convenient and that a mixture of the two may be employed provided that modulators and demodulators are included in known manner so that, where signals are combined, they are of the same kind.

Further whilst the system described employs as a basic automatic pilot one utilising the rate/rate system of control, a position control automatic pilot can equally well be employed with corresponding modification of the control laws.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

What we claim is:

1. An automatic flight control system for use during a landing maneuver of an aircraft, comprising means responsive to lateral acceleration of the aircraft to provide a signal dependent upon said lateral acceleration, means responsive to said signal to provide a demand for maneuver of the aircraft in bank which demand is dependent upon said lateral acceleration in a sense to oppose tendency for roll of the aircraft arising with said lateral acceleration, and means responsive to said bank-demand for controlling the aircraft in bank in accordance with the demand.

2. An automatic flight control system according to claim 1 wherein said means responsive to the bank-demand comprises means to control ailerons of the aircraft in accordance with the demanded maneuver in bank.

3. An automatic flight control system according to claim 1, means responsive to maneuver of the aircraft in bank to provide a signal dependent upon the bank maneuver, said means for providing the bank-demand being responsive to the bank-maneuver signal to include in the bank-demand a component dependent upon such signal.

4. An automatic flight control system according to claim 3 wherein said means to provide the bank-maneuver signal produces a signal dependent upon rate of change of bank.

5. An automatic flight control system according to claim 4, means responsive to rate of rotation, $p$, of the aircraft about its fore-aft axis to provide a measure of the rate $p$, means responsive to rate of yaw, $r$, of the aircraft to provide a measure of the rate $r$, means responsive to pitch angle $\theta$ of the aircraft to provide a measure of angle $\theta$, and means to provide in accordance with said measures of $p$, $r$, and $\theta$ a signal dependent upon the function $(p+r\theta)$ to constitute said signal dependent upon rate of change of bank.

6. An automatic flight control system according to claim 4, a phase-advancing network, and means for supplying said bank-maneuver signal via the phase-advancing network to said means for providing the bank-demand.

7. An automatic flight control system according to claim 1, means responsive to yaw of the aircraft to provide a signal dependent upon a function of yaw, said means for providing the bank-demand being responsive to the last-mentioned signal to include in the bank-demand a component which is dependent upon said function of yaw and which is in a sense to oppose tendency of the aircraft to roll in response to yawing movement of the aircraft.

8. An automatic flight control system according to claim 1, means responsive to angular movement of the aircraft's rudder to provide a signal dependent upon a function of the rudder-position, said means for providing the bank-demand being responsive to the last-mentioned signal to include in the bank-demand a component dependent upon said function of rudder-position.

9. An automatic flight control system according to claim 1 wherein said means responsive to lateral acceleration has a pendulum mounted for angular deflection about an axis parallel to the fore-aft axis of the aircraft, and said signal dependent upon the lateral acceleration is dependent upon angular deflection of the pendulum.

10. An automatic flight control system according to claim 9 wherein said pendulum is mounted forward of the center of gravity of the aircraft.

11. An automatic flight control system for use during a landing maneuver of an aircraft, comprising means responsive to lateral acceleration of the aircraft to provide a signal dependent upon said lateral acceleration, means responsive to said signal to provide a demand for movement of ailerons of the aircraft which demand has a component that is dependent upon said lateral acceleration and is in a sense to oppose tendency of the aircraft to roll, and a servo channel responsive to said demand to control the ailerons in accordance with the demand.

12. An automatic flight control system according to claim 11, means for providing a signal dependent upon a function of angular position of the ailerons, means for providing a signal dependent upon difference between actual and desired headings of the aircraft, and means responsive to the last-mentioned two signals for controlling the rudder of the aircraft in accordance with the function of angular position of the ailerons and the heading difference.

13. An automatic flight control system according to claim 12, means responsive to yaw of the aircraft to provide a signal dependent upon a function of the rate of yaw, the means for controlling the rudder being responsive to such signal to control the rudder in accordance with said function of yaw-rate.

14. An automatic flight control system for use during a landing maneuver of an aircraft, comprising a lateral pendulum to provide a signal dependent upon pendulum displacement-angle resulting from lateral acceleration of the aircraft, means responsive to said signal to provide a demand for movement of ailerons of the aircraft which demand has a component that is dependent upon the displacement-angle and is in a sense to oppose tendency of the aircraft to roll, and a servo channel responsive to said demand to control the ailerons in accordance with the demand.

15. An automatic flight control system for use during a landing maneuver of an aircraft, comprising means responsive to lateral acceleration of the aircraft to provide a first signal dependent upon said lateral acceleration, means for providing a second signal dependent upon movement of the aircraft rudder, means responsive to said first and second signals to derive a signal which is representative of a demand for movement of ailerons of the aircraft and which has two components that are dependent respectively upon said lateral acceleration and rudder movement in a sense to oppose tendency of the aircraft to roll, and a servo channel for controlling the ailerons in accordance with said demand.

16. An automatic flight control system for use during a landing maneuver of an aircraft, comprising means responsive to lateral acceleration of the aircraft to provide a first signal dependent upon said lateral acceleration, means for providing a second signal dependent upon movement of the aircraft rudder, means for providing a third signal dependent upon movement of the aircraft ailerons, means for providing a fourth signal dependent upon difference between actual and desired headings of the aircraft, means for controlling the ailerons of the aircraft in accordance with said first and second signals so as to oppose tendency of the aircraft to roll, and means for controlling the rudder of the aircraft in accordance with said third and fourth signals.

References Cited by the Examiner
UNITED STATES PATENTS

| | | | |
|---|---|---|---|
| 2,987,276 | 6/61 | Osder | 244—77 |
| 3,073,553 | 1/63 | Coleman | 244—77 |

MILTON BUCHLER, *Primary Examiner.*

RALPH D. BLAKESLEE, *Examiner.*